US010711533B2

(12) United States Patent
Yoshikawa et al.

(10) Patent No.: US 10,711,533 B2
(45) Date of Patent: Jul. 14, 2020

(54) THREADED PIPE JOINT

(71) Applicant: JFE Steel Corporation, Chiyoda-ku, Tokyo (JP)

(72) Inventors: Masaki Yoshikawa, Handa (JP); Kazunari Takahashi, Handa (JP); Taro Kanayama, Handa (JP); Jun Takano, Handa (JP); Takamasa Kawai, Handa (JP); Tsuyoshi Yoneyama, Handa (JP)

(73) Assignee: JFE Steel Corporation, Tokyo (JP)

( * ) Notice: Subject to any disclaimer, the term of this patent is extended or adjusted under 35 U.S.C. 154(b) by 298 days.

(21) Appl. No.: 15/561,778

(22) PCT Filed: Mar. 28, 2016

(86) PCT No.: PCT/JP2016/001801
§ 371 (c)(1),
(2) Date: Sep. 26, 2017

(87) PCT Pub. No.: WO2016/157887
PCT Pub. Date: Oct. 6, 2016

(65) Prior Publication Data
US 2018/0080287 A1    Mar. 22, 2018

(30) Foreign Application Priority Data

Mar. 30, 2015    (JP) ................................. 2015-068045

(51) Int. Cl.
*E21B 17/042*    (2006.01)
*E21B 17/08*    (2006.01)
*F16L 15/04*    (2006.01)

(52) U.S. Cl.
CPC ........ *E21B 17/085* (2013.01); *E21B 17/0423* (2013.01); *E21B 17/08* (2013.01); *F16L 15/04* (2013.01)

(58) Field of Classification Search
CPC ..... E21B 17/0423; E21B 17/042; F16L 15/04
(Continued)

(56) References Cited

U.S. PATENT DOCUMENTS 4,582,348 A * 4/1986 Dearden ............... E21B 17/042
285/334
5,415,442 A  5/1995 Klementich
(Continued)

FOREIGN PATENT DOCUMENTS

CA    2977021 A1    10/2016
CA    3010955 A1 * 11/2018 ......... E21B 17/0423
(Continued)

OTHER PUBLICATIONS

International Search Report and Written Opinion for International Application PCT/JP2016/001801, dated Jun. 21, 2016—5 Pages.
(Continued)

*Primary Examiner* — David Bochna
(74) *Attorney, Agent, or Firm* — RatnerPrestia

(57) ABSTRACT

A threaded pipe joint, when acted upon by a tensile load, does not break on the female thread-side of a first thread section of a second thread series that extends from an intermediate shoulder. The threaded pipe joint reliably undergoes tensile rupture on the female thread-side of a first thread section of a first thread series, which is the original critical cross-section site. The threaded pipe joint is configured so that when the male and female threads of the intermediate shoulder are screwed together, the load flank-side thread gaps L1G and L2G of a first thread series, which is the radially inward thread series, and a second thread series, which is the radially outward thread series, on the two sides of the intermediate shoulder always satisfy the relationship L1G<L2G.

3 Claims, 4 Drawing Sheets

(58) Field of Classification Search
USPC .................................................. 285/333, 334
See application file for complete search history.

(56) References Cited

U.S. PATENT DOCUMENTS

| | | | |
|---|---|---|---|
| 5,462,315 A | | 10/1995 | Klementich |
| 6,155,613 A | * | 12/2000 | Quadflieg ............... F16L 15/06 285/334 |
| 7,506,900 B2 | | 3/2009 | Carcagno et al. |
| 2003/0132633 A1 | | 7/2003 | Maeda et al. |
| 2006/0145480 A1 | * | 7/2006 | Mallis ................. E21B 17/0423 285/390 |
| 2007/0236015 A1 | | 10/2007 | Sugino et al. |
| 2009/0058085 A1 | | 3/2009 | Breihan et al. |
| 2010/0171306 A1 | * | 7/2010 | Gillot ................... F16L 15/002 285/334 |
| 2012/0074693 A1 | * | 3/2012 | Mallis ................. E21B 17/0423 285/334 |
| 2012/0325361 A1 | | 12/2012 | Durivault et al. |
| 2014/0203556 A1 | * | 7/2014 | Besse .................... E21B 17/042 285/390 |

FOREIGN PATENT DOCUMENTS

| | | |
|---|---|---|
| CN | 101010536 A | 8/2007 |
| CN | 201198739 Y | 2/2009 |
| CN | 103791181 A | 5/2014 |
| CN | 104131788 A | 11/2014 |
| CN | 205638264 U | 10/2016 |
| JP | 07504483 A | 5/1995 |
| JP | 1113728 A | 1/1999 |
| JP | 2013519854 A | 5/2013 |
| JP | 5232475 B2 | 7/2013 |

OTHER PUBLICATIONS

Extended European Search Report for European Application No. 16 77 1775.0, dated May 9, 2018, 5 pages.
Chinese Office Action for Chinese Application No. 201610191671.X, dated Oct. 9, 2017, including Concise Statement of Search Report, 7 pages.

* cited by examiner (a) AXIAL REACTION FORCE ACTING ON LOAD FLANK SURFACE OF EACH THREAD (CONVENTIONAL EXAMPLE)

(b) AXIAL REACTION FORCE ACTING ON LOAD FLANK SURFACE OF EACH THREAD (PRESENT INVENTION EXAMPLE)

THREADED PIPE JOINT

CROSS REFERENCE TO RELATED APPLICATIONS

This is the U.S. National Phase application of PCT/JP2016/001801, filed Mar. 28, 2016, which claims priority to Japanese Patent Application No. 2015-068045, filed Mar. 30, 2015, the disclosures of these applications being incorporated herein by reference in their entireties for all purposes.

TECHNICAL FIELD OF THE INVENTION

The present invention relates to a threaded pipe joint used for connecting oil well pipes including tubing and casing used generally in exploration of oil wells or gas wells and in production. That is, the present invention relates to a threaded pipe joint used for connecting steel pipes such as oil country tubular goods (OCTG), riser pipes, and line pipes. The threaded pipe joint of the present invention has excellent resistance to tensile fracture.

BACKGROUND OF THE INVENTION

Threaded pipe joints are widely used in connecting steel pipes used in oil-producing industrial installations such as oil well pipes. For the connection of pipes used in oil or gas prospecting and production, standard threaded pipe joints based on the API (American Petroleum Institute) standard are typically used.

Since crude oil wells and natural gas wells have recently increased in depth, and horizontal wells and directional wells are now more common than vertical wells, excavation and production environments are increasingly under harsh condition. Furthermore, an increase in well development under hostile environments, such as in ocean and polar regions, has led to diversified performance requirements for threaded pipe joints, such as compression resistance, bending resistance, and sealability against external pressure.

On the other hand, in order to reduce the amount of excavation during the development of a well, the well needs to be made slimmer. Among high-performance special threaded pipe joints called premium joint, requirements for an integral-type threaded pipe joint that directly connects pipes with no coupling member interposed therebetween are increasing.

The premium joint normally has a tapered thread, a metal-to-metal seal portion, and a torque shoulder portion at the end of each pipe. These are components forming each of a pin that is a male-shaped portion provided at one end of a pipe and a box that is a female-shaped portion provided at the other end of the pipe and is screwed or fitted on the male-shaped portion. These components are designed such that when a joint (which means a threaded pipe joint, the same applies hereinafter) is tightened, female and male components having the same name face each other.

The tapered thread is important for firmly securing the joint. The metal-to-metal seal portion is important for ensuring sealability by bringing the box and the pin into metal-to-metal contact with each other in the region of the metal-to-metal seal portion. The torque shoulder portion serves as a shoulder face that acts as an abutment during the make-up of the joint.

In the integral-type threaded pipe joint (hereinafter also referred to as integral joint), one or two or more metal-to-metal seal portions are provided in the axial direction (which means the axial direction of the pipe, the same applies hereinafter). At least one of the metal-to-metal seal portions is provided on the outer peripheral surface of an unthreaded portion (hereinafter referred to as nose) continuous with the pin-front-end-side thread end of the tapered thread of the pin, and on the inner peripheral surface of an unthreaded portion (hereinafter referred to as nose hole) continuous with the box-back-end-side thread end of the tapered thread of the box. When make-up the joint, the metal-to-metal seal portion of the nose and the metal-to-metal seal portion of the nose hole come into contact with each other in the radial direction, and this metal-to-metal seal portion forms a seal surface (referred to as inner radial seal surface for convenience sake) that prevents fluid inside the pipe from entering the region of the tapered thread.

In some integral joints, in each of the pin and the box, the region of the tapered thread is divided into two parts in the axial direction. Of the two parts, the thread row on the pin-front-end side and the thread row on the box-back-end side engaged with this are referred to as first thread row. On the other hand, the thread row on the pin-back-end side and the thread row on the box-front-end side engaged with this are referred to as second thread row. In the radial direction (which means the radial direction of the pipe, the same applies hereinafter), the first thread row is on the inner side, and the second thread row is on the outer side. The torque shoulder portion is provided at the boundary of the first thread row and the second thread row, and this is referred to as intermediate shoulder. If this intermediate shoulder is provided, since the shoulder surfaces of the pin and the box come into contact with each other at the time of tightening, a tightening torque is increased. Therefore it is possible to watch the tightening torque for checking whether the female and male threads have been appropriately fitted with seal surfaces.

In an integral joint having the intermediate shoulder, when two metal-to-metal seal portions are provided in the axial direction, one of the two metal-to-metal seal portions forms the inner radial seal surface. The other metal-to-metal seal portion is provided on the outer peripheral surface of the unthreaded portion continuous with the back end of the second thread row of the pin (referred to as pin-back-end-side unthreaded surface for convenience sake), and on the inner peripheral surface of the unthreaded portion continuous with the front end of the second thread row of the box (referred to as box-front-end-side unthreaded surface for convenience sake). When make-up the joint, the metal-to-metal seal portion of the pin-back-end-side unthreaded surface and the metal-to-metal seal portion of the box-front-end-side unthreaded surface come into contact with each other in the radial direction, and this metal-to-metal seal portion forms a seal surface (referred to as outer radial seal surface for convenience sake) that prevents fluid outside the pipe from entering the region of the tapered thread.

A threaded joint for pipes (threaded pipe joint) described in Patent Literature 1 is shown in FIG. 5 as an example of conventional art of an integral joint having the intermediate shoulder. The aim (object) of the invention described in Patent Literature 1 is to produce a threaded joint for pipes that maintains appropriate rigidity and that is provided with an improved seal, to improve the structural resistance (characteristic) of the joint to a high load, specifically to a compressive load, and to prevent the characteristic from affecting the seal function. In the invention described in Patent Literature 1, a reinforcing section protruding from the metal-to-metal seal portion of the box-front-end-side unthreaded surface to the frontmost end of the box is provided, the length, or the length and the wall thickness of this reinforcing section are regulated, and the total length of the reinforcing section of the box is prevented from coming into contact with the opposing pin-back-end side pipe (pipe body portion).

CITATION LIST

Patent Literature

Patent Literature 1: Japanese Patent No. 5232475

SUMMARY OF INVENTION

Technical Problem

However, there is a problem that cannot be solved by the conventional art, as described below.

In an oil well pipe in a state where a plurality of pipes having joint portions (the male-shaped portion and the female-shaped portion are collectively referred to as joint portion) are connected in series with the joint portions and are installed into a well, the nearer to the ground a pipe is, the larger tensile load applies on the joint portion of the pipe. In terms of strength, to avoid fatigue breaking or tensile fracture of the joint portion is one of important joint performances. Joint efficiency generally used as an index for evaluating the limit tensile load of a joint is given by the following equation:

joint efficiency=[area of critical cross-section in the female thread region/nominal cross-sectional area of the pipe body portion]×100(%).

Here, the critical cross-section means a cross-section perpendicular to the pipe axis that is the most prone to fracture in a state where a tensile load is applied to the joint. The nominal cross-sectional area of the pipe body portion means a cross-section perpendicular to the pipe axis of a cylinder having an outer diameter and a wall thickness equal to the nominal outer diameter and the nominal wall thickness of the main body portion, which is a pipe having joints from which the joints are removed. The larger the value of joint efficiency is, the higher the limit tensile performance of the joint is.

A cross-section located on the load flank of the first thread in the female-thread-side thread region is adopted as the critical cross-section, and a joint is designed so as to fracture at the critical cross-section in a tensile load test. When fracture occurs at a cross-section other than the critical cross-section, the tensile load at the time of fracture does not reach the limit tensile load, and the limit tensile load cannot be evaluated correctly.

In the case of an integral joint in which female and male tapered thread regions are not divided in two and that does not have an intermediate shoulder, the joint fractures as expected at the critical cross-section in a tensile load test, and the limit tensile load can be evaluated correctly. However, in the case of an integral joint having an intermediate shoulder, there are examples in which the joint fractures unexpectedly at a cross-section other than the critical cross-section in a tensile load test, and the limit tensile load cannot be evaluated correctly. This is a problem.

In the case of an integral joint having an intermediate shoulder, as with an integral joint having no intermediate shoulder, the critical cross-section is normally located on the female thread side, on the female thread side of the first thread portion of the first thread row. However, in the case of an integral joint having an intermediate shoulder, the location where fracture actually occurs is different from the location of the expected normal critical cross-section and is on the female thread side of the first thread portion of the second thread row near the intermediate shoulder. Here, the n-th thread portion of the first or second thread row means the n-th axial section from the front end of a cone forming a tapered thread in the first or second thread row in which the thread makes a circuit along the thread helix. The first thread portion is the case where n=1.

In view of the above problem, it is an object of the present invention to provide a threaded pipe joint that is of an integral type with an intermediate shoulder and that is of a radial seal type, wherein under a tensile load, fracture on the female thread side near the intermediate shoulder (particularly the first thread portion of the second thread row continuous with the intermediate shoulder) is avoided, and tensile fracture certainly occurs on the female thread side of the first thread portion of the first thread row, which is the location of the normal critical cross-section.

Solution to Problem

The inventors gave a great deal of consideration to an appropriate thread shape using FEA (finite element analysis) in order to solve the above problem. As a result, a finding was obtained that a structure such that when stretched, fracture does not occur on the female thread side of the first thread portion of the second thread row continuous with the intermediate shoulder, and fracture certainly occurs on the female thread side of the first thread portion of the first thread row, which is the expected normal critical cross-section, and when compressed, the load is shared mainly by the intermediate shoulder, can be achieved by appropriately controlling the axial thread gap, and the present invention was made. That is, the present invention is as follows:

[1] A threaded pipe joint including: a pin having a male thread that is a male tapered thread at one end of a pipe; and a box having a female thread that is a female tapered thread threadedly engaged with the male thread at the other end of the pipe, the threaded pipe joint being of an integral type that directly connects pipes with the pin and the box, the threaded pipe joint having a radial seal structure in which the pin and the box are in metal-to-metal contact with each other in the radial direction to seal fluid, the threaded pipe joint further including: an intermediate shoulder formed in the middle of the thread row of the female and male tapered threads; wherein, under a condition where the female and male threads of the intermediate shoulder are threadedly engaged with each other, the load-flank-side thread gap $L1G$ of a first thread row that is the thread row on the radially inner side and the load-flank-side thread gap $L2G$ of a second thread row that is the thread row on the radially outer side, with the intermediate shoulder interposed between the first thread row and the second thread row, always satisfy the relationship $L1G<L2G$.

[2] The threaded pipe joint according to [1], wherein, the female and male thread pitch of the first thread row and the second thread row are set to a standard thread pitch p, and the load-flank-side thread gap $L1Gm$ of the thread portion of the first thread row closest to the intermediate shoulder and the load-flank-side thread gap $L2G1$ of the thread portion of the second thread row closest to the intermediate shoulder are set such that $L1Gm<L2G1$ under a condition where the female and male threads of the intermediate shoulder are threadedly engaged with each other.

[3] The threaded pipe joint according to [2], wherein the female thread pitch from the radially innermost first thread portion to at least the third thread portion of the first thread row is set to a long pitch pl that satisfies the following expression (1) instead of the standard thread pitch p:

$$p < pl < p \times \{1 + (Fw - Mw)/d1\} \quad (1),$$

where p is the standard thread pitch,
pl is the long pitch,
Fw is the axial width of the thread valley of the female thread,
Mw is the axial width of the thread mountain of the male thread, and
d1 is the female thread length of the first thread row.

[4] The threaded pipe joint according to [2] or [3], wherein the female thread pitch from the radially innermost first thread portion to at least the third thread portion of the second thread row is set to a short pitch ps that satisfies the following expression (2) instead of the standard thread pitch p:

$$p \times \{1 - (Fw - Mw)/d2\} < ps < p \quad (2),$$

where p is the standard thread pitch,
ps is the short pitch,
Fw is the axial width of the thread valley of the female thread,
Mw is the axial width of the thread mountain of the male thread, and
d2 is the female thread length of the second thread row.

Advantageous Effects of Invention

According to the present invention, when a tensile load applies on the joint, load flank surface contact occurs first in the first thread row, and the first thread row shares the tensile load. Therefore, when load flank surface contact occurs then in the second thread row, all the thread portions of the joint share the tensile load. As a result, the joint certainly fractures at the normal critical cross-section.

DESCRIPTION OF EMBODIMENTS

Figure 1:
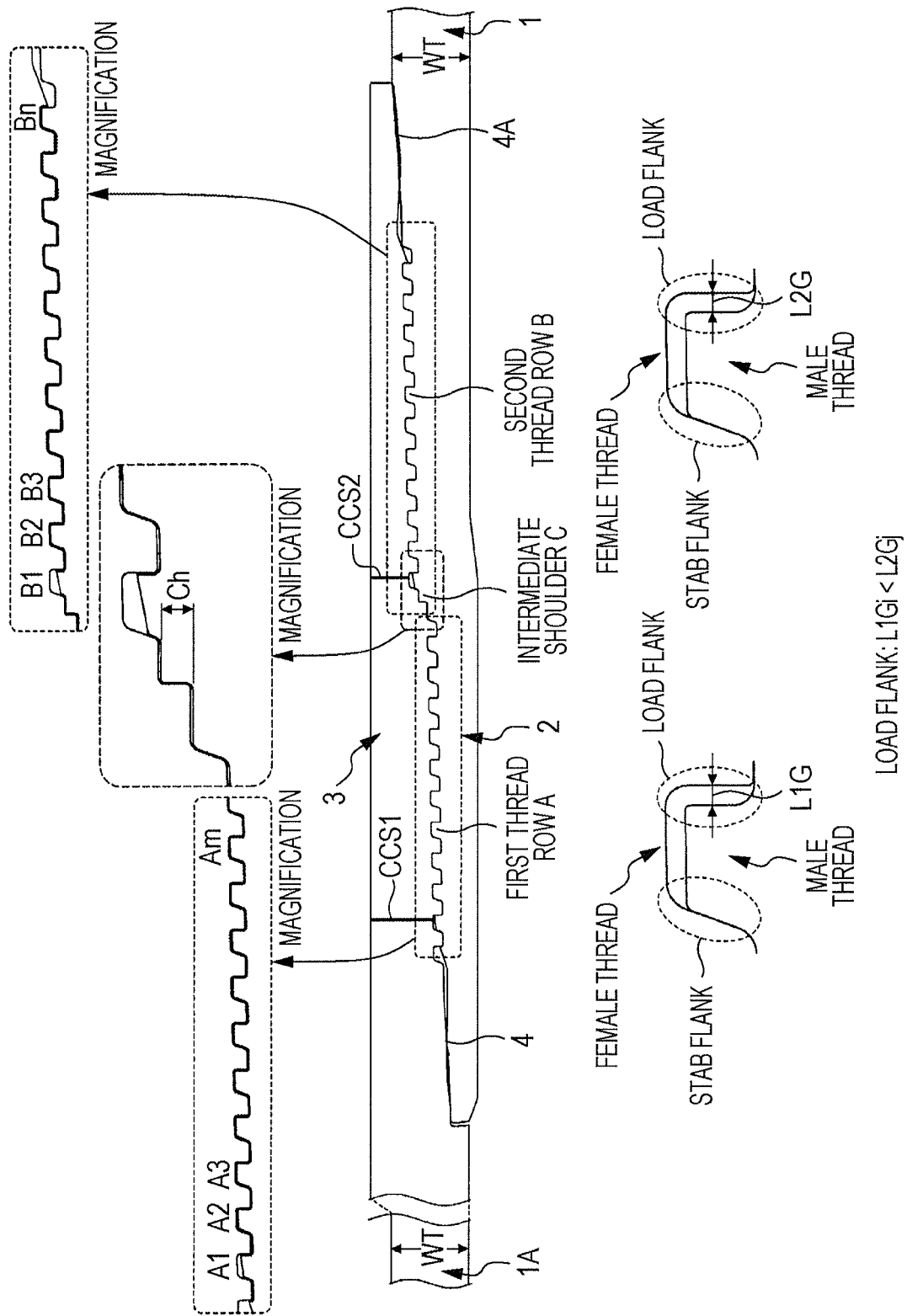
FIG. 1 is a schematic view of an axial section of a joint showing an example of an embodiment of the present invention.

FIG. 1 is a schematic view of an axial section (section in a direction parallel to the axis) of a joint showing an example of an embodiment of the present invention. This example is a state in which two pipes whose pipe main bodies (pipe body portions) 1 and 1A have a wall thickness WT are connected to each other. Both pipes each have a pin 2 having a male thread that is a male tapered thread at one end of the pipe, and a box 3 having a female thread that is a female tapered thread threadedly engaged with the male thread at the other end of the pipe. The pin 2 and the box 3 form an integral-type joint in which the male thread of the pin 2 and the female thread of the box 3 are threadedly engaged with each other to directly connect both pipes 1 and 1A. The pin 2 and the box 3 are formed by thickening both end parts of the pipe main body, performing outer surface thread cutting and inner and outer surface non-thread cutting on the thickened part that will become the pin 2, and performing inner surface thread cutting and inner and outer surface non-thread cutting on the thickened part that will become the box 3. This joint is also a radial seal type joint in which the pin 2 and the box 3 come into metal-to-metal contact with each other in the radial direction to seal fluid. In the embodiment of FIG. 1, two metal-to-metal seal portions that seal fluid by metal-to-metal contact (hereinafter simply referred to as seal portions) are provided in the axial direction. One of them is a seal portion 4 provided in the nose on the pin-front-end side and the nose hole on the box-back-end side. The other is a seal portion 4A provided on the unthreaded surface on the pin-back-end side and the unthreaded surface on the box-front-end side.

This joint has an intermediate shoulder C in the middle of the thread row of the female and male tapered threads. Integral joints having an intermediate shoulder include a flush type and a semi-flush type. The semi-flush type means a joint such that a female thread formed by causing the female-thread-side pipe end to protrude radially outwardly by expanding processing, and threading it, and a male thread formed by causing the male-thread-side pipe end to protrude radially inwardly by diameter-reducing processing, and threading it, are fitted together. The flush type means a joint such that a female thread is formed at one end and a male thread is formed at the other end without expansion and diameter-reducing processing, and they are fitted together. The present invention can be applied to both the flush type and the semi-flush type.

In this joint, under a condition where the female and male threads of the intermediate shoulder C are threadedly engaged with each other, that is, in a state where the axially opposed surfaces of the intermediate shoulder C on the pin 2 side and the intermediate shoulder C on the box 3 side are in contact with each other, the load-flank-side thread gap L1G of the first thread row A which is the thread row on the radially inner side, and the load-flank-side thread gap L2G of the second thread row B which is the thread row on the radially outer side, with the intermediate shoulder C interposed thread rows A and, always satisfy the relationship L1G<L2G. That is, the thread gaps are set such that when the load-flank-side thread gaps from the radially innermost first thread portion A1 to the radially outermost m-th thread portion Am in the first thread row A are denoted by L1Gi (i=1, 2, ... m) in order, and the load-flank-side thread gaps from the radially innermost first thread portion B1 to the radially outermost n-th thread portion Bn in the second thread row B are denoted by L2Gj (j=1, 2, ... n), the relationship L1Gi<L2Gj is always satisfied although there is variation within the range of tolerance.

Thus, when a tensile load acts on the joint, female-male contact of load flank occurs first in the first thread row A, and the first thread row A shares the tensile load. Therefore, when female-male contact of load flank occurs then in the second thread row B, all the thread portions of the joint share the tensile load.

Conventionally, at the time of a tensile load, female-male contact of load flank occurs in the second thread row B before female-male contact of load flank occurs in the first thread row A, and fracture may occur at a cross-section CCS2 on the female thread side of the first thread portion B1 of the second thread row B. In contrast, in the present invention, female-male contact of load flank occurs in the first thread row A before female-male contact of load flank occurs in the second thread row B. Therefore, fracture does not occur at the cross-section CCS2, and fracture certainly occurs at a cross-section CCS1 on the female thread side of the first thread portion A1 of the first thread row A, which is the expected normal critical cross-section.

The present invention described in [2], [3], and [4] (referred to as means [2], [3], and [4] for convenience sake) are each means for setting thread gaps such that the relationship L1Gi<L2Gj is always held in the present invention described in [1] (referred to as means [1] for convenience sake). These will be described below.

In means [2], in means [1], the pitch of female and male threads of the first thread row A and the second thread row B is set to a standard thread pitch p. In addition, in means [2], the load-flank-side thread gap L1Gm of the thread portion of the first thread row A closest to the intermediate shoulder C and the load-flank-side thread gap L2G1 of the thread portion of the second thread row B closest to the intermediate shoulder C are set such that L1Gm<L2G1 when the female and male threads of the intermediate shoulder C are in contact with each other. Since the pitch of the female and male threads of each of the first thread row A and the second thread row B is a standard pitch p, the load-flank-side thread gap L1Gi (i=1. . . m) of each thread portion in the first thread row A is equal to L1Gm, and the load-flank-side thread gap L2Gj (j=1 . . . n) of each thread portion in the second thread row B is equal to L2G1. Therefore, the relationship LiGi<L2Gj is satisfied.

Next, in means [3], in means [2], the female thread pitch from the first thread portion A1 to at least the third thread portion A3 of the first thread row A is set to a long pitch pl that satisfies the following expression (1) instead of the standard thread pitch p. Except for such a change in thread pitch, means [3] is the same as means [2].

$$p<pl<p\times\{1+(Fw-Mw)/d1\} \quad (1)$$

where p is the standard thread pitch, pl is the long pitch, Fw is the axial width of the thread valley of the female thread, Mw is the axial width of the thread mountain of the male thread, and d1 is the female thread length of the first thread row.

Figure 2:
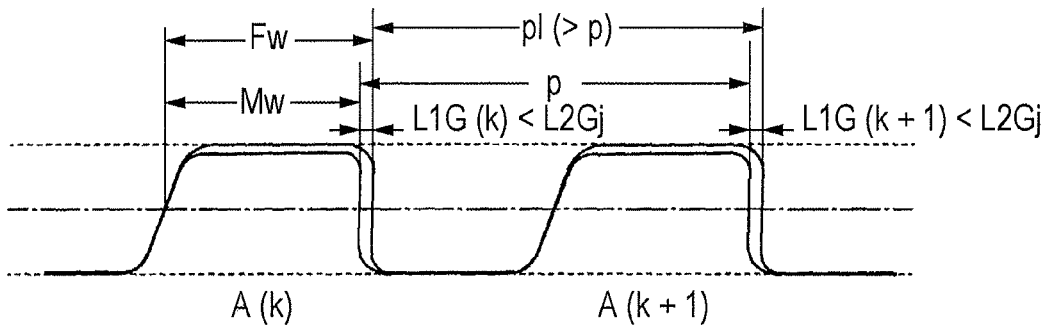
FIG. 2 is a schematic view of an axial section of the first thread row when the female and male threads of the intermediate shoulder are in contact with each other, showing an example of means [3].

An example of means [3] is shown in FIG. 2. In this example, the female thread pitch of all the thread portions in the first thread row A is set to the long pitch pl. Except for this, this example is the same as means [2]. FIG. 2 shows thread portions A (k) and A (k+1) when i=k and k+1 in the Ai-th thread portion in the first thread row A, and their respective load-flank-side thread gaps L1G (k) and L1G (k+1). As shown, in addition to LAG (k)<L2Gj and L1G (k+1)<L2Gj, L1G (k)=L1G (k+1)−(pl−p). Since pl>p, L1Gi decreases by (pl−p) every time the thread portion Ai approaches the pin front end side by one pitch (i decreases by 1), and as a result, L1G1 is the smallest of all the thread portions. Therefore, at the time of a tensile load, relatively high tensile stress and strain are generated in the first thread portion A1 of the first thread row A, and as a result, fracture occurs more certainly not at the cross-section CCS2 on the female thread side of the first thread portion B1 of the second thread row B but at the expected normal critical cross-section CCS1.

However, the total (pl−p) of all Ai (i=1 . . . m) must not exceed the designed amount of gap (Fw−Mw), and therefore, (pl−p)×m<Fw−Mw. On the other hand, m=d1/p, and therefore, pl needs to satisfy the right-hand inequality of expression (1), pl<p×{1+(Fw−Mw)/d1}.

In the example of FIG. 2, the female thread pitch of all the thread portions in the first thread row A is set to the long pitch pl. However, the present invention is not limited to this. Even when the female thread pitch from the first thread portion A1 to "at least the third thread portion A3" ("any one of A (3) to A (m−1)") is set to the long pitch pl, the advantageous effect that the cross-section CCS1 is certainly the critical cross-section can be obtained.

Next, in means [4], based on means [2] or means [3], the female thread pitch from the first thread portion B1 to at least the third thread portion B3 of the second thread row B is set to a short pitch ps that satisfies the following expression (2) instead of the standard thread pitch p. Except for such a change in thread pitch, means [4] is the same as means [2] or means [3] on which means [4] is based.

$$p\times\{1-(Fw-Mw)/d2\}<ps<p \quad (2)$$

where p is the standard thread pitch, ps is the short pitch, Fw is the axial width of the thread valley of the female thread, Mw is the axial width of the thread mountain of the male thread, and d2 is the female thread length of the second thread row.

Figure 3:
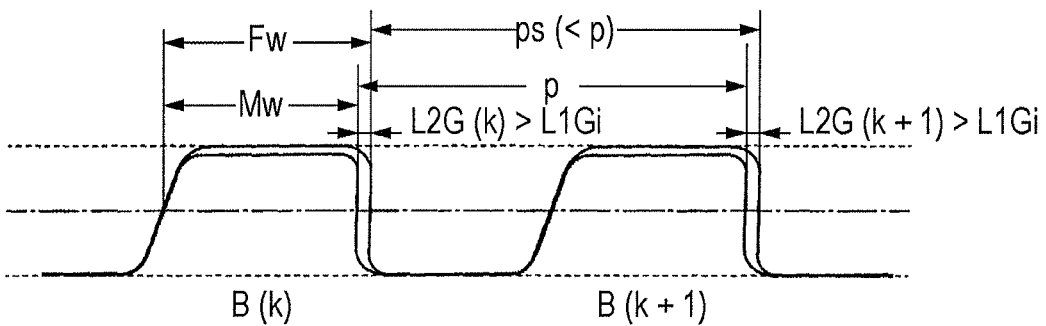
FIG. 3 is a schematic view of an axial section of the second thread row when the female and male threads of the intermediate shoulder are in contact with each other, showing an example of means [4].

An example of means [4] is shown in FIG. 3. In this example, based on means [3], the female thread pitch of all the thread portions in the second thread row B is set to the short pitch ps. Except for this, this example is the same as means [3]. FIG. 3 shows thread portions B (k) and B (k+1) when j=k and k+1 in the Bj-th thread portion in the second thread row B, and their respective load-flank-side thread gaps L2G (k) and L2G (k+1). As shown, in addition to L2G (k)>L1Gi and L2G (k+1)>L1Gi, L2G (k)=L2G (k+1)+(p−ps). Since ps<p, L2Gj increases by (p−ps) every time the thread portion Bj approaches the intermediate shoulder C side by one pitch (j decreases by 1), and as a result, L2G1 is the largest of all the thread portions. Therefore, at the time of a tensile load, relatively low tensile stress is generated in the first thread portion B1 of the second thread row B, and as a result, the possibility of fracture at the cross-section CCS2 is lower.

However, the total (p−ps) of all Bj (j=1 n) must not exceed the designed amount of gap (Fw−Mw), and therefore, (p−ps)×n<Fw−Mw. On the other hand, n=d2/p, and therefore, ps needs to satisfy the left-hand inequality of expression (2), ps>p×{1−(Fw−Mw)/d2}.

In the example of FIG. 3, the female thread pitch of all the thread portions in the second thread row B is set to the short pitch ps. However, the present invention is not limited to this. Even when the female thread pitch from the first thread portion B1 to "at least the third thread portion B3" ("any one of B (3) to B (n−1)") is set to the short pitch ps, the advantageous effect that fracture at the cross-section CCS2 is certainly avoided can be obtained. Although the example of FIG. 3 is based on means [3], the same advantageous effect is obtained also in the case based on means [2].

In the present invention, in order to achieve joint efficiency of 80% or more, the height Ch of the intermediate shoulder C (see FIG. 1) is preferably 10% or less of the wall thickness WT of the pipe main bodies 1 and 1A, and more preferably 8% or less. On the other hand, if the height Ch is less than 3% of the wall thickness WT, it is difficult to exhibit the effect of the intermediate shoulder C as an abutment, and therefore, the height Ch is preferably 3% or more of the wall thickness WT, and more preferably 5% or more.

In the design of an actual well, a safety factor is applied to the structural strength against stretch corresponding to the joint efficiency of the threaded pipe joint, and therefore tensile fracture does not occur in the joint immediately. On the other hand, there is a case where although the tensile load is small, a compressive load acts due to drilling or thermal stress, and there is a risk that fatigue breaking due to repeated stretch/compression occurs in the thread portions.

In this case, since in the present invention, the intermediate shoulder C is provided, the compressive load is received mainly by the intermediate shoulder C. As a result, the range of repeated stress and strain due to repeated stretch/compressive load on the thread portions is reduced, and the risk of fatigue breaking can also be reduced.

When a shoulder (not shown) is provided at each end so as to be adjacent to the seal portion 4, 4A, at the time of repeated stretch/compressive load, deformation reaches not only these shoulders but also the seal portions 4 and 4A, and there is a risk that the sealability decreases. So, the integral joint according to the present invention has a structure such that the seal portions 4 and 4A on the inner side and the outer side are of the radial seal type in which the pin 2 and the box 3 are radially in metal-to-metal contact with each other in a relatively long range to seal fluid, and the end faces of the seal portions 4 and 4A are non-contact in the axial direction.

In the present invention, whether the stab flank angle is positive or negative, and whether the load flank angle is positive, negative, or square, the advantageous effects of the present invention is substantially the same. It is also found that when the condition that the stab flank angle is 10 degrees to 30 degrees and the load flank angle is −10 degrees to 0 degrees is satisfied, the advantageous effects of the present invention can be obtained regardless of the detailed shape of the seal portions.

On both the stab flank side and the load flank side, a case where the straight outline of each side in the axial section is parallel to a line perpendicular to the axial direction is referred to as square, and the flank angle is 0 degrees. On the other hand, in a case where it is non-parallel, the flank angle is defined as the acute one of the angles formed by the straight outline on each of the stab flank side and the load flank side of the thread mountaintop and a line perpendicular to the axial direction. The sign convention used here is such that the flank angle is positive when the point of intersection between a line perpendicular to the axial direction disposed in the middle in the axial direction of the thread mountaintop and the extended line of the straight outline is located on the radially outer side of the thread mountaintop, and the flank angle is negative when that point of intersection is located on the radially inner side of the thread mountaintop.

Example

A conventional example was such that, in an integral joint having the intermediate shoulder C shown in FIG. 1, the joint efficiency was 80%, the number of male threads of the first thread row A and the number of male threads of the second thread row B were both 10, the thread pitch of the female thread and the thread pitch of the male thread were both the standard pitch p, the height Ch of the intermediate shoulder C was 8% of the wall thickness WT of the pipe main bodies 1 and 1A, and when the female and male threads of the intermediate shoulder C were in contact with each other, the relationship between the load-flank-side thread gap L1Gi (i=1 . . . 10) of each thread portion Ai of the first thread row A and the load-flank-side thread gap L2Gj (j=1 . . . 10) of each thread portion Bj of the second thread row B was such that L1Gi=L2Gj, the load flank angle was −5, and the stab flank angle was 10 degrees. The pipe main bodies 1 and 1A are seamless steel pipes having an outer diameter of 9.625 inches and a wall thickness WT of 0.545 inches.

The present invention example was such that, in the above conventional example, according to means [4] based on means [3], L1G10<L2G1 when the female and male threads of the intermediate shoulder C were in contact with each other, the female thread pitch of all the thread portions of the first thread row A was set to the long pitch pl satisfying expression (1) instead of the standard thread pitch p, the female thread pitch of all the thread portions of the second thread row B was set to the short pitch ps satisfying expression (2) instead of the standard thread pitch p, and a change from the relationship condition L1Gi=L2Gj to the relationship condition L1Gi<L2Gj was thereby made, and except for this, the present invention example was the same as the conventional example.

Figure 4:
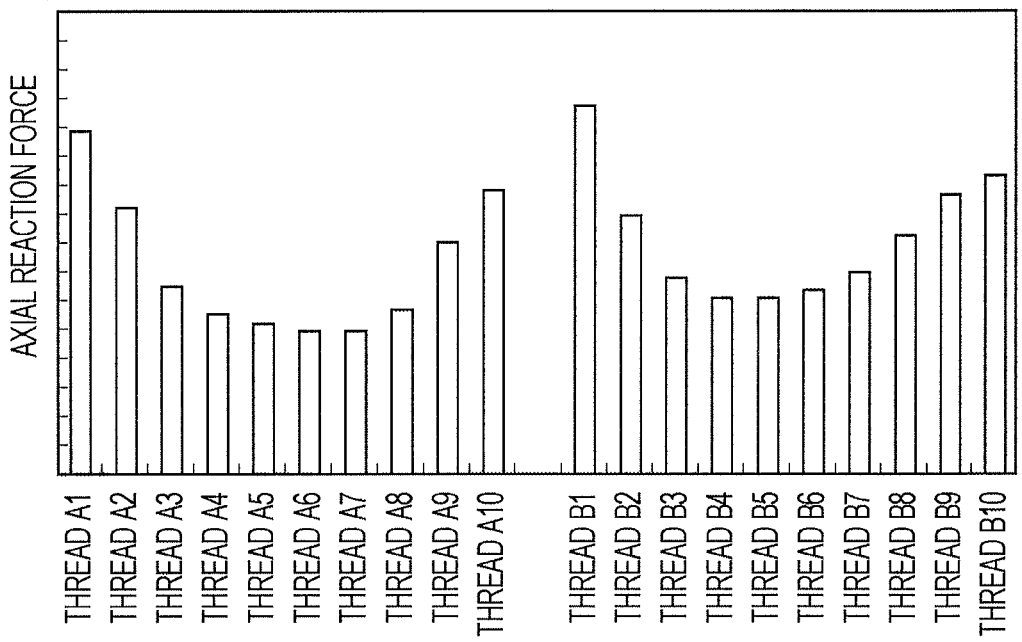
FIG. 4 is a graph showing comparison between the axial reaction force acting on the load flank surface of each thread portion under a tensile load after make-up analyzed by FEA in (a) conventional example and that in (b) the present invention example.
Figure 4:
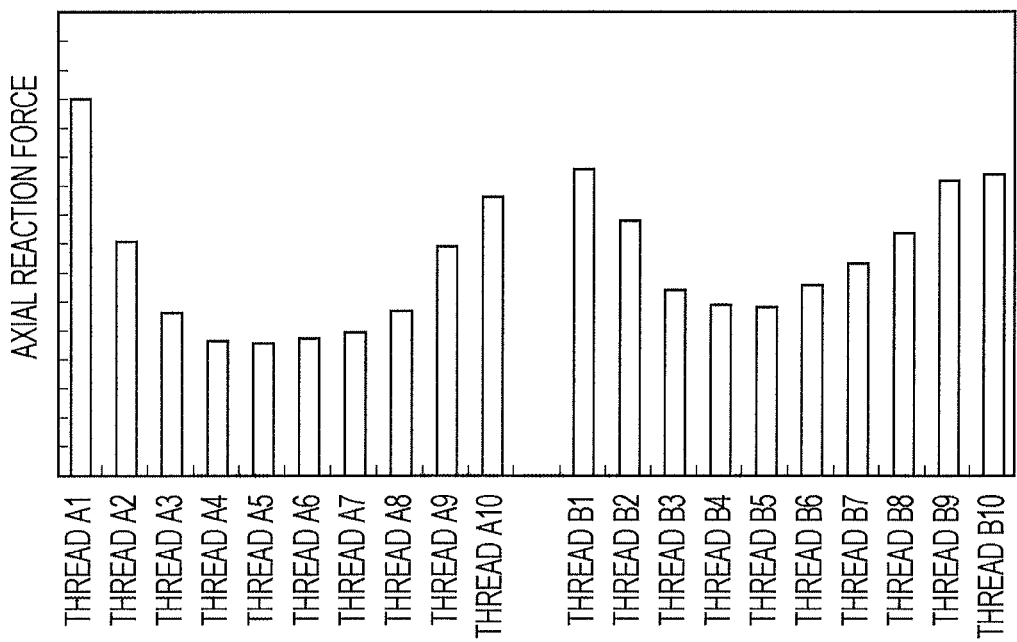
Figure 5:
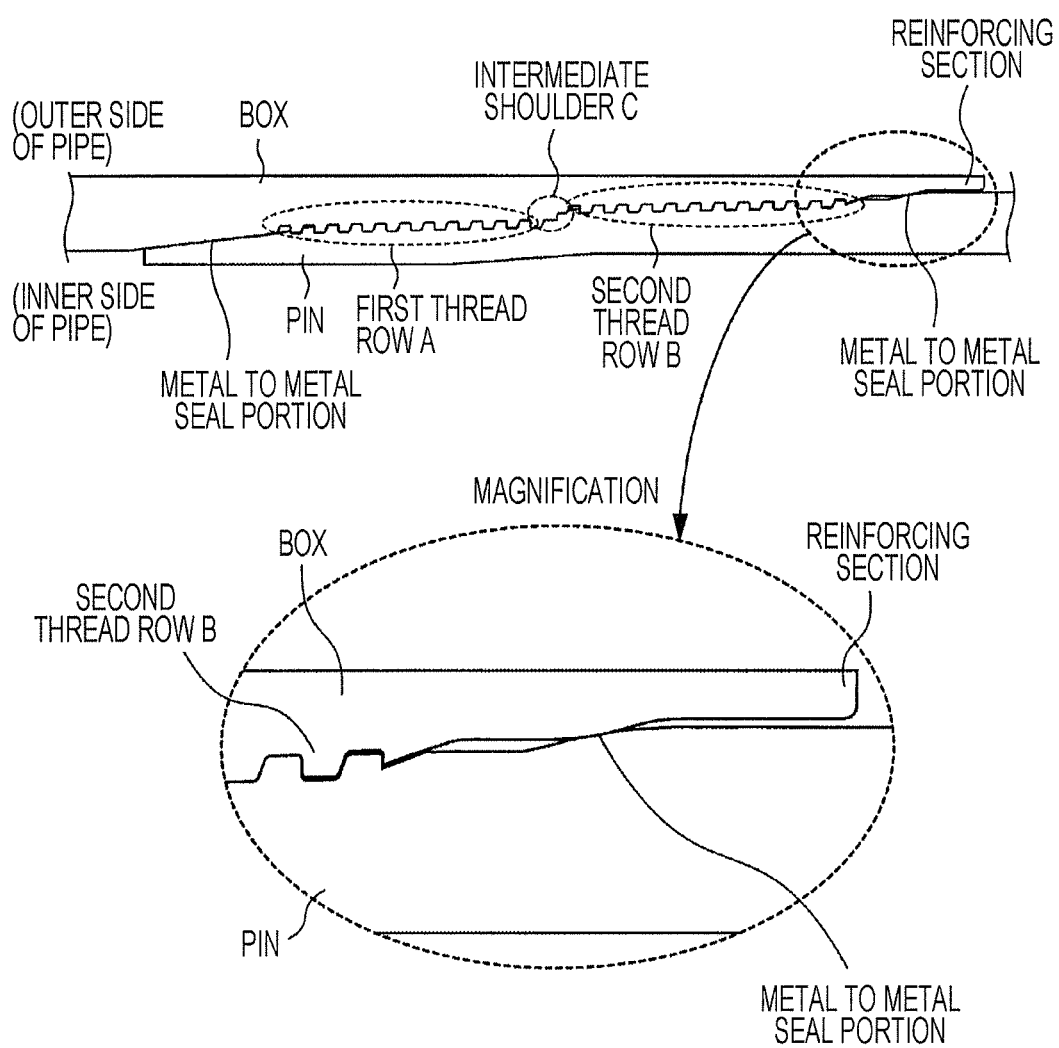
FIG. 5 is a schematic view of an axial section showing an example of a conventional integral joint.

FIG. 4 is a graph showing the result of analysis by FEA of the axial reaction force to the load flank surface of each thread portion under a tensile load after make-up in (a) conventional example and (b) the present invention example. As shown, in the conventional example, the axial reaction force is largest in the first thread portion (thread B1) of the second thread row B, and in the present invention example, the axial reaction force is largest in the first thread portion (thread A1) of the first thread row A.

In an actual tensile load test, the result of which matches the above analysis result, the conventional example underwent tensile fracture at the box-side cross-section of the thread B1 (cross-section different from the normal critical cross-section), and the limit tensile load was not able to be evaluated correctly. On the other hand, the present invention example underwent tensile fracture at the box-side cross-section of the thread A1 (the normal critical cross-section), and the limit tensile load was able to be evaluated correctly.

REFERENCE SIGNS LIST 1, 1A pipe main body (pipe body portion)
2 pin
3 box
4, 4A seal portion (specifically, metal-to-metal seal portion)
A first thread row
B second thread row
C intermediate shoulder

The invention claimed is:
1. A threaded pipe joint comprising:
a pin having a male thread that is a male tapered thread at one end of a pipe; and
a box having a female thread that is a female tapered thread threadedly engaged with the male thread at the other end of the pipe,
the threaded pipe joint being of an integral type that directly connects pipes with the pin and the box, the threaded pipe joint having a radial seal structure in which the pin and the box are in metal-to-metal contact with each other in the radial direction to seal fluid, the threaded pipe joint further comprising:

an intermediate shoulder formed in the middle of the thread row of the female and male tapered threads, wherein, under a condition where the female and male threads of the intermediate shoulder are threadedly engaged with each other, the load-flank-side thread gap L1G of a first thread row that is the thread row on the radially inner side and the load-flank-side thread gap L2G of a second thread row that is the thread row on the radially outer side, with the intermediate shoulder interposed between the first thread row and the second thread row, always satisfy the relationship L1G<L2G, wherein the female and male thread pitch of the first thread row and the second thread row are set to a standard thread pitch p, wherein the load-flank-side thread gap L1Gm of the thread portion of the first thread row closest to the intermediate shoulder and the load-flank-side thread gap L2G1 of the thread portion of the second thread row closest to the intermediate shoulder are set such that L1Gm<L2G1 under a condition where the female and male threads of the intermediate shoulder are threadedly engaged with each other, and wherein the female thread pitch from the radially innermost first thread portion to at least a third thread portion of the first thread row is set to a long pitch pl that satisfies the following expression (1) instead of the standard thread pitch p:

$p < pl < p \times \{1+(Fw-Mw)/d1\}$ ... (1), where p is the standard thread pitch, pl is the long pitch, Fw is the axial width of the thread valley of the female thread, Mw is the axial width of the thread mountain of the male thread, and d1 is the female thread length of the first thread row.

2. The threaded pipe joint according to claim 1, wherein the female thread pitch from the radially innermost first thread portion to at least the third thread portion of the second thread row is set to a short pitch ps that satisfies the following expression (2) instead of the standard thread pitch p:

$p \times \{1-(Fw-Mw)/d2\} < ps < p$ ... (2), where p is the standard thread pitch, ps is the short pitch, Fw is the axial width of the thread valley of the female thread, Mw is the axial width of the thread mountain of the male thread, and d2 is the female thread length of the second thread row.

3. A threaded pipe joint comprising:

a pin having a male thread that is a male tapered thread at one end of a pipe; and a box having a female thread that is a female tapered thread threadedly engaged with the male thread at the other end of the pipe, the threaded pipe joint being of an integral type that directly connects pipes with the pin and the box, the threaded pipe joint having a radial seal structure in which the pin and the box are in metal-to-metal contact with each other in the radial direction to seal fluid, the threaded pipe joint further comprising:

an intermediate shoulder formed in the middle of the thread row of the female and male tapered threads, wherein, under a condition where the female and male threads of the intermediate shoulder are threadedly engaged with each other, the load-flank-side thread gap L1G of a first thread row that is the thread row on the radially inner side and the load-flank-side thread gap L2G of a second thread row that is the thread row on the radially outer side, with the intermediate shoulder interposed between the first thread row and the second thread row, always satisfy the relationship L1G<L2G, wherein the female and male thread pitch of the first thread row and the second thread row are set to a standard thread pitch p, wherein the load-flank-side thread gap L1Gm of the thread portion of the first thread row closest to the intermediate shoulder and the load-flank-side thread gap L2G1 of the thread portion of the second thread row closest to the intermediate shoulder are set such that L1Gm<L2G1 under a condition where the female and male threads of the intermediate shoulder are threadedly engaged with each other, and wherein the female thread pitch from the radially innermost first thread portion to at least a third thread portion of the second thread row is set to a short pitch ps that satisfies the following expression (2) instead of the standard thread pitch p:

$p \times \{1-(Fw-Mw)/d2\} < ps < p$ ... (2), where p is the standard thread pitch, ps is the short pitch, Fw is the axial width of the thread valley of the female thread, Mw is the axial width of the thread mountain of the male thread, and d2 is the female thread length of the second thread row.

* * * * *